(No Model.) 2 Sheets—Sheet 1.
H. A. KING.
ANTI FRICTION BEARING.
No. 373,807. Patented Nov. 22, 1887.
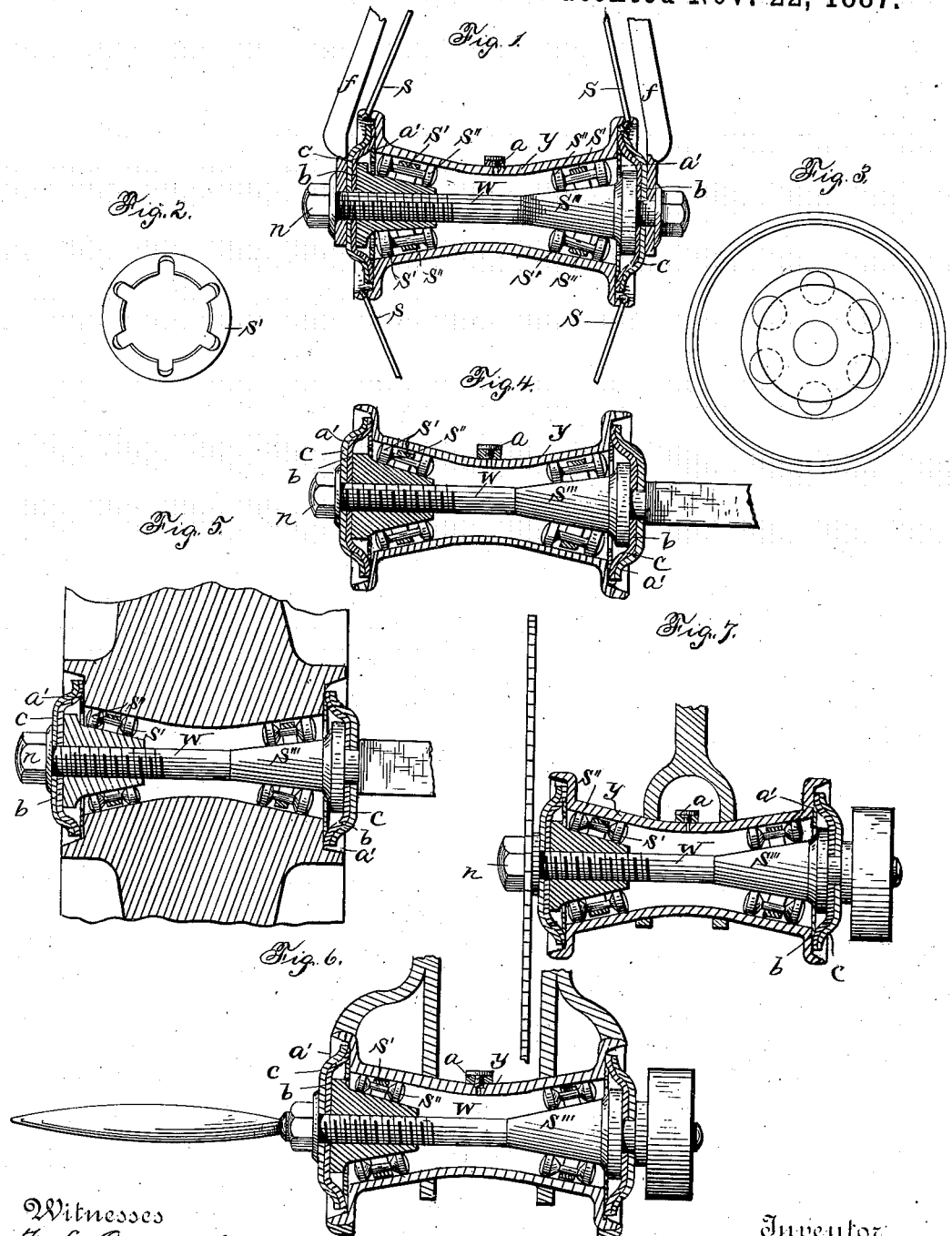
Witnesses
F. L. Durand
F. E. Gaither
Inventor
Homer A. King (No Model.) 2 Sheets—Sheet 2.
H. A. KING.
ANTI FRICTION BEARING.
No. 373,807. Patented Nov. 22, 1887.
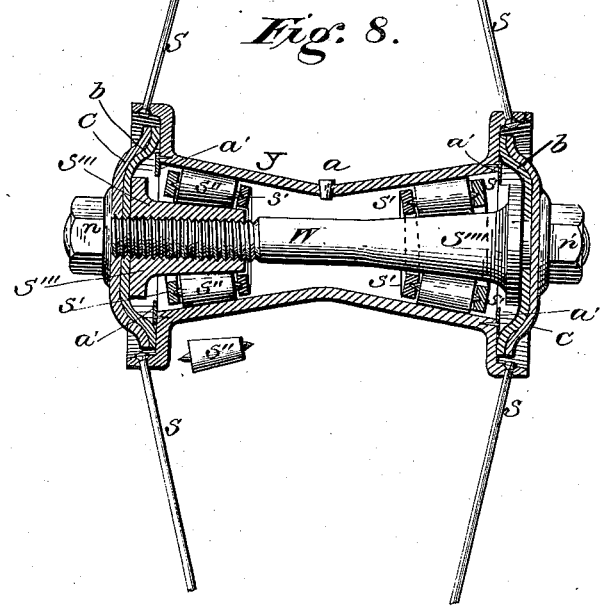
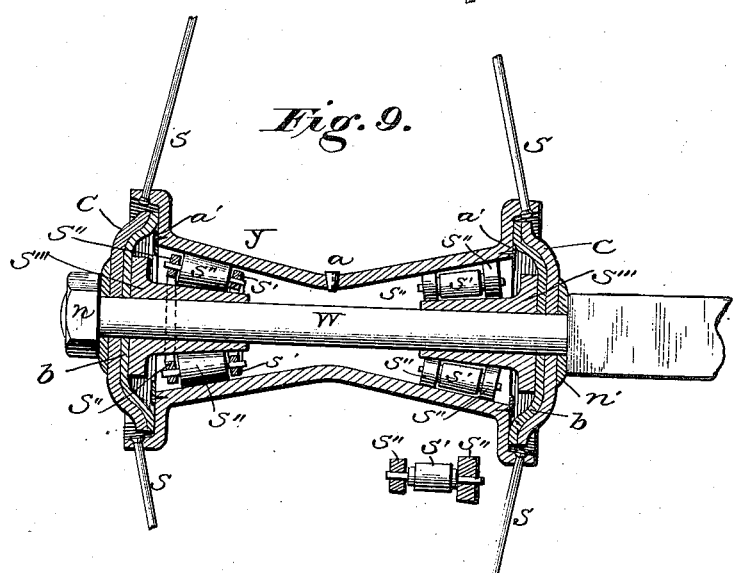
Witnesses.
F. L. Ourand
H. A. Smith
Inventor.
Homer A. King

UNITED STATES PATENT OFFICE.

HOMER A. KING, OF SPRINGFIELD, MASSACHUSETTS, ASSIGNOR TO THE KING WHEEL COMPANY, OF NEW YORK, N. Y.

ANTI-FRICTION BEARING.

SPECIFICATION forming part of Letters Patent No. 373,807, dated November 22, 1887.

Application filed September 28, 1886. Serial No. 214,773. (No model.)

*To all whom it may concern:*

Be it known that I, HOMER A. KING, a citizen of the United States, residing at Springfield, in the county of Hampden and State of Massachusetts, have invented new and useful Improvements in Anti-Frictional Bearings, which improvements are fully set forth in the following specification, the accompanying drawings making part of this specification.

My invention relates to improvements upon my anti-friction bearings patented under the title of "velocipedes," May 4, 1886, No. 341,383, also Patents Nos. 349,801 and 349,802, issued September 28, 1886, but is applicable to any other bearings where it is desirable to avoid friction and frequency of oiling.

Referring to the drawings, similar letters of reference indicate corresponding parts.

Figure 1 is a sectional view of part of a small wheel of a velocipede with spokes $s$, fork $ff$, hub $y$, adjustable anti-frictional roller-bearings $s'$, $s''$, and $s'''$, oil-inlet $a$, oil-shield $a'$, screwed fast to the hub, and felt dust-pad $b$ between the hub and the dust-shield $c$, both shown in cross section and adjusted laterally by the nut $n$ on the axle $w$. The inclination $s'''$ may be solid on one end or loose on both ends, with or without screw-thread, for lateral adjustment, and the rollers $s''$ may be composed of one piece of metal or of two or three, and held by the axis at the center or at both ends on a pivot or otherwise. Fig. 2 is an end view of the collar $s'$ in Fig. 1, which holds the rollers apart and in place. Fig. 3 is an outline end view of the hub $y$, rollers $s''$, and axle $w$. Fig. 4 is a sectional view of the anti-frictional bearings with a part of an axle of a carriage or wagon wheel. Fig. 5 is a sectional view of the anti-frictional bearings with an axle and car-wheel. Fig. 6 is a sectional view of my anti-frictional bearings with brackets to hold each end of the hub, and with a pulley on one end of the axle or shaft, and with a head on the other end over the axle or shaft, which is extended as a cotton-spindle for spinning. Fig. 7 is a sectional view of the anti-frictional bearings held in brackets and supporting a saw-mandrel. Fig. 8 shows the inclined rollers $s''$ held apart and in place on pivots at each end in $s'$, the oil-shield $a'$, secured by screws or otherwise to hub $y$, the felt dust-pad $b$, and the metal dust-shield $c$. Fig. 9 shows the inclined rollers $s''$ on the left hand, composed of one piece of metal, held in place and apart in $s'$ at both ends, and the rollers on the right hand composed of two pieces of metal held in place and apart on an axis in the center. Fig. 9 also shows the inclined collar or cones $s'''$ without internal thread, being adjusted by nut $n$, and a washer or washers, $n'$, on one or both ends of the axle.

It is evident that the parts may be varied and yet be the same invention.

Having described my invention, what I claim as new in this application is—

1. The dust-shield $c$, in combination with inclined adjustable roller-bearings running in a circle between an inclined surface on the outside of the circle and an inclined surface on the inside of the circle and held apart from rolling together.

2. The flexible dust-pad $b$ between the end of the outer inclined surface and the dust-shield, in combination with inclined adjustable roller-bearings running in a circle between an inclined surface on the outside of the circle and an inclined surface on the inside of the circle.

3. The oil-guard $a'$, rigidly secured in the end of the outer inclined surface, in combination with inclined roller-bearings running in a circle between an inclined surface on the outside of the circle and an inclined surface on the inside of the circle.

4. The combination of the dust-shield $c$, and oil-guard $a'$, with inclined adjustable roller-bearings running in a circle between an inclined surface on the outside of the circle and on the inside of the circle, an inclined collar, encircling and adjustable laterally upon an axle or shaft, essentially as set forth.

HOMER A. KING.

Witnesses:
WILLIAM F. MELLOWS,
WALDO E. CLARK.